United States Patent [19]
Ishmael

[11] Patent Number: 6,092,355
[45] Date of Patent: *Jul. 25, 2000

[54] CONTROL SYSTEM

[75] Inventor: William Ishmael, Medina, Ohio

[73] Assignee: MTD Products Inc., Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/863,087

[22] Filed: May 23, 1997

Related U.S. Application Data

[63] Continuation of application No. 08/517,079, Aug. 21, 1995, abandoned, which is a continuation of application No. 08/279,040, Jul. 22, 1994, abandoned.

[51] Int. Cl.⁷ ................................................. A01D 34/78
[52] U.S. Cl. ......................... 56/11.9; 56/16.7; 56/10.2 R
[58] Field of Search ................................. 56/11.9, 10.8, 56/10.5, 10.2 R, 16.7, 17.1, DIG. 15; 324/103 R, 103 P, 104, 115

[56] References Cited

U.S. PATENT DOCUMENTS

| | | | |
|---|---|---|---|
| 1,704,520 | 3/1929 | Sommer | 324/103 R |
| 2,736,884 | 2/1956 | Yeomans | 340/664 |
| 3,103,654 | 9/1963 | Long | 340/664 |
| 3,530,337 | 9/1970 | Moore | 340/664 |
| 3,572,455 | 3/1971 | Brueske | 180/214 |
| 3,809,975 | 5/1974 | Bartels | 318/39 |
| 3,831,160 | 8/1974 | Cronin et al. | 340/635 |
| 3,916,400 | 10/1975 | Lewis | 340/657 |
| 3,967,133 | 6/1976 | Bokern | 307/10 R |
| 4,008,423 | 2/1977 | Christianson et al. | 318/139 |
| 4,250,501 | 2/1981 | Pokrandt | 340/664 |
| 4,281,288 | 7/1981 | Izumi | 324/158 |
| 4,321,523 | 3/1982 | Hammel | 320/14 |
| 4,396,986 | 8/1983 | Salesky | 364/483 |
| 4,514,724 | 4/1985 | Valentine | 340/664 |
| 4,555,093 | 11/1985 | Plummer | 254/362 |
| 4,559,577 | 12/1985 | Shuji et al. | 340/664 |
| 4,581,711 | 4/1986 | Hirata et al. | 340/664 |
| 4,583,086 | 4/1986 | Andrews et al. | 340/664 |
| 4,835,453 | 5/1989 | Munning-Schmidt et al. | 320/13 |
| 4,937,528 | 6/1990 | Palanisamy | 324/430 |
| 5,144,218 | 9/1992 | Bosscha | 320/44 |
| 5,301,494 | 4/1994 | Peot et al. | 56/10.5 |
| 5,315,293 | 5/1994 | Kamiya | 340/664 |
| 5,388,176 | 2/1995 | Dykstra et al. | 388/811 |
| 5,442,901 | 8/1995 | Niemela et al. | 56/11.9 |
| 5,490,370 | 2/1996 | Mcnair et al. | 56/11.9 |

OTHER PUBLICATIONS

"Model Railroader" Magazine Advertisement of Model Rectifier Corporation Tech–3 Power Command, May, 1993.

Primary Examiner—Richard A. Moller
Attorney, Agent, or Firm—Emerson & Associates; Roger D. Emerson; Timothy D. Bennett

[57] ABSTRACT

A load indicator for a battery powered lawn mower is disclosed, which load indicator indicates to the operator when the power train of the lawn mower is being operated out of its designed parameters. A control circuit also reduces the initial amperage through the contacts between the battery and motor for the lawn mower appliance.

14 Claims, 2 Drawing Sheets

CONTROL SYSTEM

This application is a continuation of application Ser. No. 08/517,079 filed Aug. 21, 1995, which is a continuation of application Ser. No. 08/279,040 filed Jul. 22, 1994, now abandoned.

FIELD OF THE INVENTION

This invention relates to a load indicator and improved control system for a lawn and garden care appliance such as a battery powered rotary lawn mower.

BACKGROUND OF THE INVENTION

Electric motor driven lawn and garden appliances are very familiar to anyone having property to maintain. Typical appliances include lawn mowers, hedge clippers, chain saws, edgers, drills, and other items. As battery technology improves, frequently these appliances are powered by self contained batteries. Further, as the various governmental agencies having environmental powers regulate the pollution emissions from small gasoline engines, this use of battery powered equipment will further increase.

While electric powered appliances are useful, the customer frequently meets with some frustration due to the fact that they inadvertently overload the motor, quickly depleting a battery and/or possibly damaging the unit. The reason for this is that there is typically no overload protection or overload indication for the appliance and, unlike a gasoline motor which will audibly slow and/or stall, an electric motor will continue to drain power as long as it is switched on. This overloading of the motor is aggravated by the fact that consumers are used to the relatively inexhaustible power available in over designed gasoline motor powered units together with the indications of overload for these gasoline motors. The consumer, however, is typically not familiar with the overload characteristics of an electric motor.

In addition to the above, the necessity of providing an easy to use, but indestructible control system that can stand up to consumer abuse typically increases the cost and complexity of such controls. This abuse includes rapid cycling of the controls, trying to operate the unit with a charger connected, trying to cut too large an acreage for a given unit, overloading a mower, and other abuses.

OBJECTS AND SUMMARY OF THE INVENTION

It is an object of the present invention to provide for a convenient safe operating condition indicator to the operator.

It is another object of the present invention to lengthen the operating time for battery powered lawn and garden appliances.

It is yet another object of the present invention to lengthen the service life of battery powered lawn and garden appliances.

It is still another object of the present invention to increase consumer awareness of overload conditions.

It is a further object of the present invention to provide for an easily recognizable overload condition indicator.

It is yet a further object of the present invention to increase the usability of battery powered lawn and garden appliances.

It is still another object of the present invention to compensate for consumer abuse of electrically operated lawn and garden appliances.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description is taken in conjunction with the accompanying drawings wherein.

DETAILED DESCRIPTION OF THE INVENTION

Figure 1:
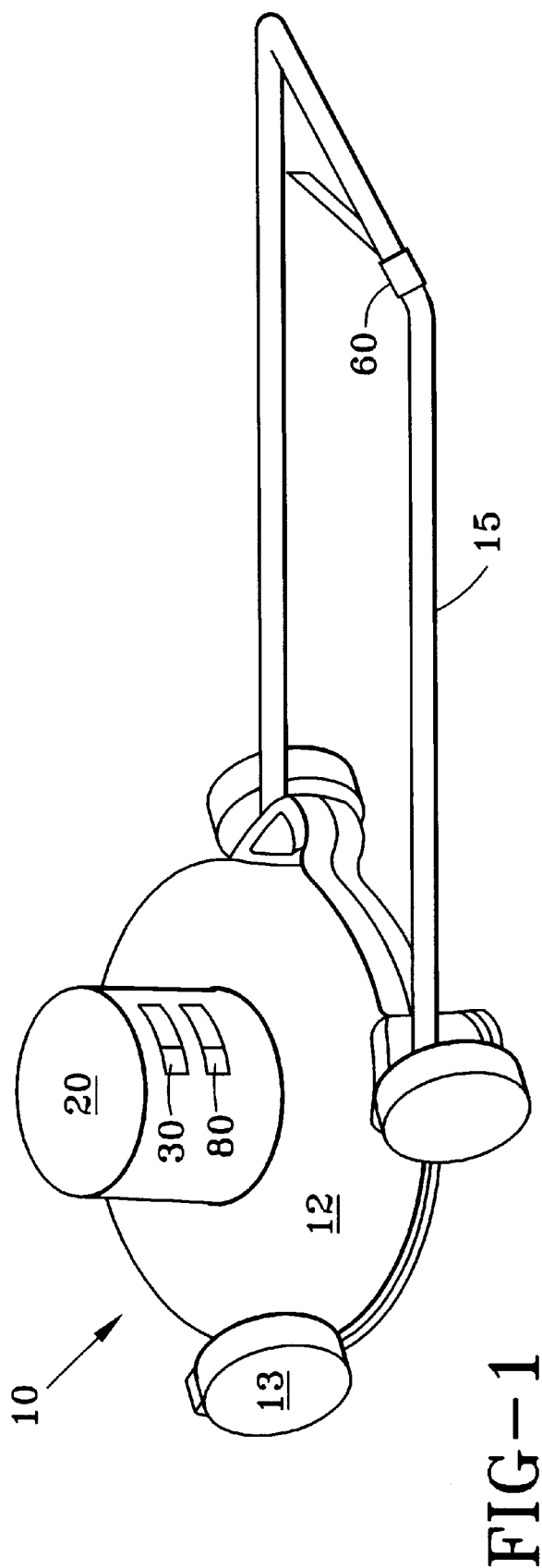
FIG. 1 is a operator's eye perspective drawing of a lawn mower incorporating the invention of the application.
Figure 2:
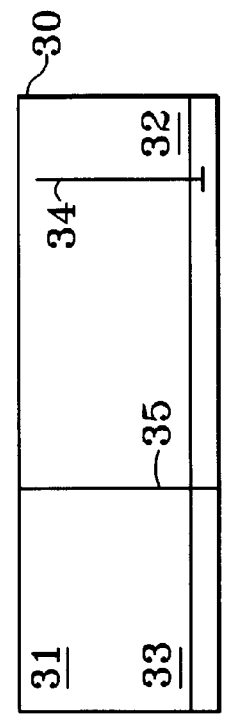
FIG. 2 is an enlarged isolated view of the load indicator utilized in the mower of FIG. 1; and, FIG. 3 is a block diagram view of the electronic circuitry contained within the lawn mower of FIG. 1.
Figure 3:
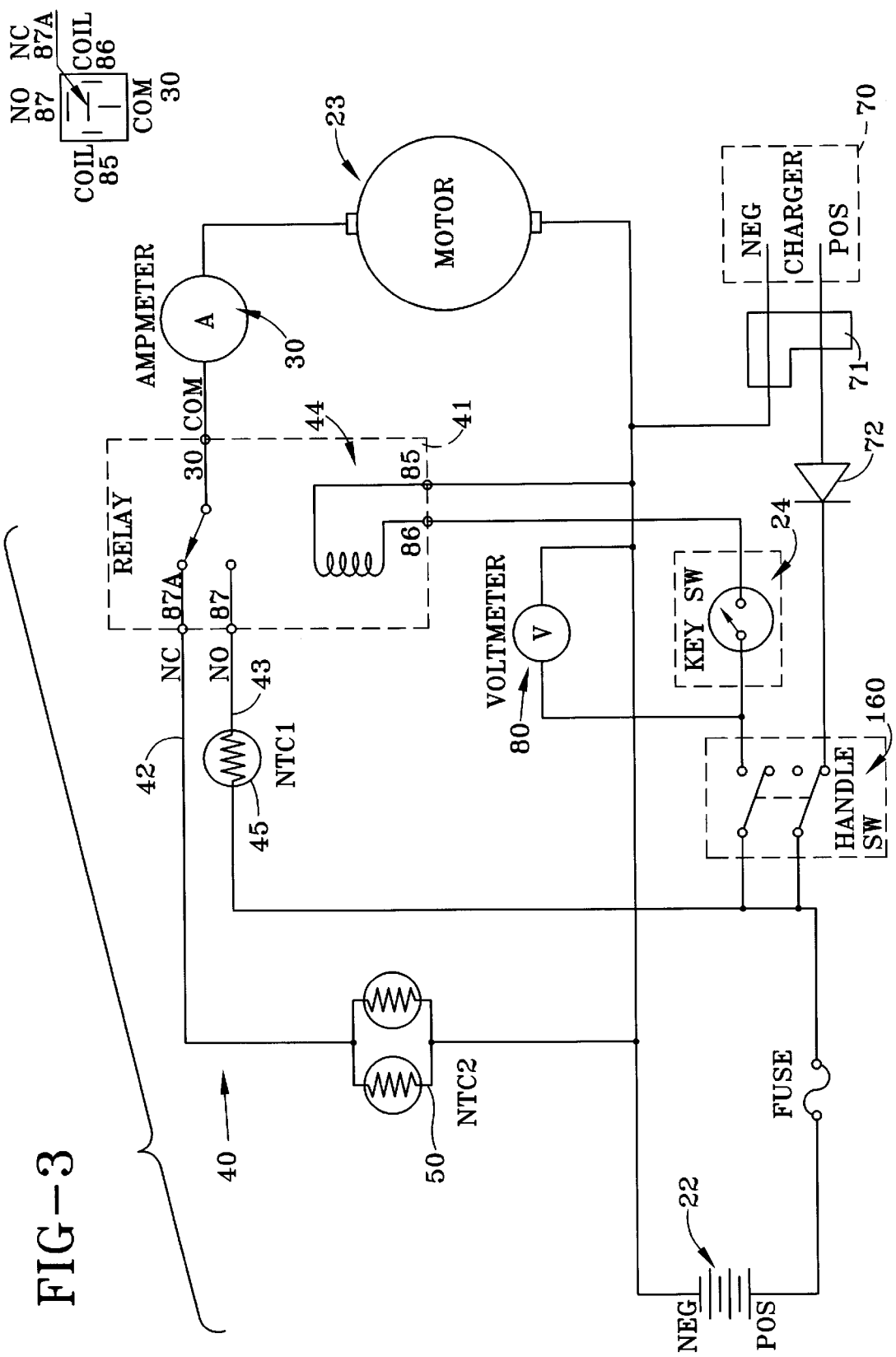

This invention relates to a load indicator and control system for electric powered lawn and garden appliances. The invention will be described in its preferred embodiment of a load indicator and control system for an electric, preferably battery powered, rotary lawn mower 10.

The appliance is an electrically powered lawn and garden device, a mower shown. This mower 10 includes a generally cylindrical housing 12 supported for travel over the ground by four wheels 13. Mounted to the top of the housing 12 is an electric power unit. In the preferred embodiment shown, an electric motor subassembly 20 is utilized for powering a rotary blade beneath the housing 12. Handlebars 15 extend rearwardly off of the housing 12 so as to allow operator control of the lawn mower. There is preferably an on/off switch 24 (later described) included in the motor subassembly 20. This particular mower is given by way of example. Other electric driven lawn and garden care appliances could be substituted.

The invention of this particular application relates in part to a load indicator which provides some sort of signal cognizant to the operator's senses to indicate when the motor of the appliance is being utilized out of its designed parameters as well as an easily used control system.

The load indicator provides the operator with easily cognizant information relative to the operating parameters of the appliance, most particularly in respect to the loading conditions thereof. A dual state acceptable/unacceptable indicator is preferred. This provides an indication to the operator that the appliance is being operated within acceptable limits. The particular load indicator disclosed is a meter mounted to the rear of the subassembly 20. This meter has a scale with two zones which are viewable to the operator. The point of transition between the two zones is selected during manufacture to optimize the performance of the particular unit. As long as the appliance is operated at (or below) this transition point, it is being operated at its optimum level. Other two condition indicators such as lights, buzzers, etc. could be substituted for the meter.

The operator is instructed that in order to obtain a maximum running time and/or optimum cutting performance for the mower, the operator should pace oneself and/or adjust the cutting height so that the indicating parameter of the load indicator is not within the unacceptable zone. The particular meter shown has green and yellow zones. With this meter, as long as the operator keeps the needle of the meter in the green, and more particularly out of the yellow zone, the power train is operating within its designed limits and thus should provide good performance. Further, if the operator retains the meter at the transition between the two zones, the unit is functioning at its optimum design level.

The invention of this particular application also relates in part to a control system that reduces the cost and lengthens the service life of the appliance. This control system selectively interconnects the source of electric power to the electric power unit. The preferred control system disclosed accomplishes this interconnection by variably increasing the amperage across the switching contacts, thus significantly increasing the service life of such contacts.

The particular control system disclosed includes a relay having a time variably increasing amperage across the relay contacts. This variable increasing amperage provides for an appliance meeting consumer expectations. It also avoids control contact arcing and burnout on start up as well as meeting regulatory standards on turn off while also not ruining the motor.

These conditions are provided invisibly without consumer actions.

The electric power unit shown is a motor subassembly 20 including a protective cover 21, a power source battery 22, a motor 23, an on/off switch 24, as well as the previously described load indicator meter 30 and control system 40.

The protective cover 21 is a thermal plastic molding designed to protect the internal components of the subassembly 20 from the elements. The protective cover 21 is removably connected to the housing 12, preferably by small bolts.

The batteries, motor, on/off switch, and control system are contained within the protective cover 21.

The batteries 22 are the source of electric power for the appliance. The particular source disclosed are sealed lead acid batteries having a certain amp hour capacity. These batteries disclosed are two YUSA batteries, Model NP-18. These batteries have an amp hour capacity of approximately 17 amps per hour. Other sources of electric power that could be substituted for these batteries are within the power source battery term.

The motor 23 is the major power unit for the appliance lawn mower 10. This motor 23 is mounted directly to the housing 12 with a portion of its shaft extending into the enclosed underside thereof. An 18" rotary cutting blade is mounted to this extending shaft of the motor 23 in a conventional manner.

The motor has a particular power draw, a power draw which is designed to provide adequate cutting power as well as complementing the amp per hour capacity of the power source in view of the expected service conditions for the appliance 10. The particular motor disclosed is a GENERAL ELECTRIC motor, Model 231C2704. This motor has a steady state power draw of approximately 17 amps.

This power unit is chosen in consideration of the power source for the appliance in order to provide approximately one hour running time for the motor 23 per full charge of the battery 22. With this running time, the mower shown should be able to cut slightly less than a quarter acre, a reasonable suburban lawn. This demonstrates by example that ideally the motor is selected first for the expected service with the power source then selected to provide the desired running time for the unit. Thereafter, the parameters of the load indicator and control system are developed to optimize the power train into an integral whole.

The on/off switch 24 located on the wires 25 extending from the battery 22 to the motor 23 is the minimum to complete the power train for the particular appliance. This switch 24 is the minimum that must be provided in order for the lawn mower 10 to be operative (as a constantly on mower 10 is undesirable).

The meter 30 in the electric circuit between the battery 22 and the motor 23 provides load indication. The meter is designed to give an indication to the operator that the electric appliance is being operated a) up to its designed performance level; and/or, b) over its designed performance level. The meter 30 is thus the load indicator for the power train.

The particular meter disclosed is a shunt type moving needle 34 ammeter made by PRIME. This meter 30 has a face 31 protruding through the protective cover 21 of the lawn mower rearwardly towards the operator station behind the handlebars 15. The face of the meter has two zones 32, 33 on the face 31 which are viewable to the operator. In the preferred embodiment, these zones are colored the instinctive color green for acceptable parameters and yellow for out of design condition. The border 35 between the two zones of this particular ammeter is designed to occur when the ammeter is registering a 17 amp draw. With this design, a constant operating condition with the needle 34 at the border 35 between the two zones 32, 33 would produce optimum designed motor operation and a one hour operating time for the lawn mower 10. However, if the operating conditions for the lawn mower are such that the needle 34 is operated continually in the yellow zone, the operator is made aware of the fact that they are operating the appliance out of its designed parameters, therefore at the minimum shortening battery power operating time per charge and potentially physically damaging the components of the power train. The operator also knows that as long as the needle 34 is in the acceptable green zone 32, the power train has excess capacity. The operator can use this excess capacity to speed up the walking pace and thus increase the load on the power train and/or use this excess capacity to anticipate more challenging upcoming cutting conditions (such as a patch of longer grass on the lawn). The load indicator thus provides feedback information to the operator relative to the condition of the power train for the lawn mower. In addition, it enables the designer and manufacturer of the lawn mower 10 to optimize a particular power train with the realization that the power train would be correctly utilized by the operator.

The control system 40 additionally connected between the source of electric power and the appliance power unit 22 further optimizes the appliance control.

The control system 40 includes a relay 41, a start up time control 45, a turn off time control 50, a handle switch 60, and a volt meter 80.

The relay 41 is a device interconnected between the key switch 24 and the motor 23 so as to increase the amperage that can be selectively controlled thereby the relay also reduces heat and other losses by providing direct, short lead switching. With an appropriate increase in capacity, direct switching could be utilized.

The particular relay 41 disclosed is a mechanical, magnetically operated dual contact normally on relay. This relay switches one connection of the motor between a normally closed 42 short to ground and a normally open 43 connection to positive battery depending on the condition of the magnetic coil 44. Other electric contacts may be substituted.

In the normally closed 42 condition of the relay, the motor 23 is not connected to power but is instead connected like a shorted generator. This has the effect of counteracting any rotation of the interconnected appliance (in this case mower blade), slowing it if rotating while resisting rotation if stationary.

In the second once normally open 43 condition of the relay, the motor 23 is connected to power, producing the functioning of the connected appliance.

In both instances, the relay 41 controls greater amperage and in a remote location based on the condition of the on/off switch 24. The on/off switch 24 can thus have a minimal capacity than otherwise. The particular relay 41 disclosed is a Pokorny 2648-S, a 24 volt coil no/nc relay having at least a 30 amp steady state conductive capacity.

Most electric motors, including the one disclosed herein, have transient start up and shorted turn off amperage far in excess of their respective steady state operating conditions. For example, while the motor disclosed herein has a 17 amp steady state amp draw, its start up amp draw has been measured at 210 amps and its turn off shorted production has been measured at 156 amps. Without the invention of this application, these transient amps can quickly destroy any switching contacts having less capacity. Indeed, a relay 41 such as that disclosed herein lasted only about 1200 cycles with direct battery/motor connections; this even though the steady state amp rating of the relay is about twice the steady state motor loading. Control circuits that can handle the transient 200+ amps are, however, typically complex and expensive.

The invention of this present invention solves this problem by providing a time variably increasing amperage across the relay contacts. With this control system, the relay contacts 42, 43 are not subject to the full start up/turn off transient amperage of the motor 23 initial engagement, but are instead subject to a variably increasing amperage after initial contact closure. This produces far less stress on and arcing of the contacts than otherwise. The reason for this is that the relay contacts are not subject to full amperage on initial engagement. Instead, the contacts develop the power transfer capability over time after engagement. For this reason, full amperage arcing with resultant contact destruction does not occur. This produces longer service life of the switching contacts.

The variable increase of amperage in a start up condition is typically different that that of a turn off condition. The reason for this is that on start up, the goal is to physically protect the switching contacts; the primary constraint on this is consumer expectations (i.e., the consumer might get annoyed at waiting five seconds each time before he could begin full load mowing). On turn off, however, there is typically also some absolute constraint. An example of this is the U.S. Government's three second blade stop standard. This provides a more definitive, and normally more restrictive, goal.

In the preferred embodiment disclosed, this variable increase in amperage is provided by negative temperature coefficient thermistors 45, 50 in series with their respective contacts. With this type of device, loading of the contacts is delayed with some of the initial transient amperage is converted into heat. In addition, the hotter the thermistors become (i.e., longer they are connected), the better they conduct (up to a maximum set value). This both delays and reduces the amperage through the contacts. Note that due to the turn off three second Government blade standard, in the embodiment disclosed two thermistors 50 are used on the normally closed contacts 42. The use of two thermistors in parallel lowers the apparent resistance providing a quicker operation at some loss of amperage transfer. This latter is acceptable due to the difference in efficiency of the motor's 23 operation as a reactive generator versus an active motor. It also reflects the differing standards that may exist for start up/turn off conditions.

The particular thermistors disclosed are Ketema SG-355 (SG-420 could be substituted). With these thermistors 45, 50 in the same test conditions as set forth before, start up amperage is reduced to 112 amps and turn off amperage is reduced to 80 amps. This reduction in amperage in combination with the relative variable increase in time of imposition (i.e., delayed load), allowed the same model of relay to operate over 25,000 cycles with less contact damage. The variable increase in amperage to the contacts thus significantly prolongs the service life of the control system 40. Other means of variably increasing the amperage over time could also be utilized.

In the embodiment shown, there is an operator presence override switch 60 mounted on the handlebars. This override switch 60 is in series with the on/off switch 24 to cut off power to the motor 23 upon the operator leaving the customary position behind the handlebars 15.

In the particular embodiment disclosed, this switch 60 also disconnects the battery charger 70 from the mower control system 40. This allows for a connection between the charger 70 and the battery 22 while preventing inadvertently connecting the charger 70 to the motor 23. The battery charger 70 itself is connected by a separable polarized plug 71 to the mower 10 so as to allow the mowers individual operation. A diode 72 prevents undue artificial loading of the charging circuit. The particular diode disclosed is a 50 volt 6 amp diode.

A volt meter 80 completes the control circuitry 40. This volt meter 80 serves to indicate to the operator what the condition of the battery 22 is versus its expected operating parameters.

The preferred volt meter 80 disclosed is made by PRIME. As with the load indicator 30, this volt meter 80 has a face protruding through the protective cover 21 of the lawn mower rearwardly towards the operator station behind the handlebars 15. The face of this meter 80 preferably has at least two zones that are viewable to the operator. In the preferred embodiment, these zones are colored the instinctive color green for acceptable voltage and red for inadequate voltage. The border between these two zones is designed to occur at substantially 18.4–19.4 volts. With this design, as long as the meter is in one zone, that colored green in the preferred embodiment, the battery will have sufficient power to operate the motor 23 to its designed operating conditions. However, if less voltage is available, the operator is made aware of this fact and that continued operation would be at a less than designed operating level. The volt meter 80 thus provides information to the operator about condition of the battery and the expected performance of the appliance. For this particular volt meter 80 full volts (top scale) is 24 volts while minimum volts (bottom scale) is 17 volts. Other types of condition indicators such as lights could be substituted.

Although the invention has been described in its preferred embodiment with a certain degree of particularity, it is to be understood that numerous changes can be made without deviating from the invention as hereinafter claimed.

What is claimed is:

1. An electric lawnmower powered by a power source battery having a capacity connected by wires to a motor which has a power draw through said wires as a result of a load on said motor located in a housing and operable by an operator, comprising:

an adjustable cutting height;

a load indicator having a first zone indicating an unacceptable power draw level, a second zone indicating an acceptable power draw level and an indicating parameter indicating an actual power draw level such that said indicating parameter being located in said first zone indicates an unacceptable actual power draw level, said load indicator being connected to said wires between said power source battery and said motor, said load indicator providing a signal indicating to said operator to alter the speed of said mower or to adjust said cutting height of said mower; and, whereby said lawnmower is operated such that said indicating parameter is located within said second zone indicating an acceptable power draw level.

2. The lawnmower of claim 1 wherein said load indicator comprises a moving needle meter.

3. The lawnmower of claim 1 further comprising:

a protective cover, said protective cover being visible to the operator, said load indicator being located within said protective cover.

4. The lawnmower of claim 1 wherein said load indicator is an ammeter wired in series with said power source battery and said motor.

5. The lawnmower of claim 1 wherein said motor has a steady state operating condition.

6. The lawnmower of claim 1 wherein said load indicator has a point of transition between said first zone and said second zone which indicates an optimum power draw level of said motor.

7. The lawnmower of claim 1 wherein said power source battery has a set amp hour capacity, said power draw depleting said battery in certain length of time.

8. The lawnmower of claim 1 further comprising:

a voltmeter having a first zone and a second zone, said first zone indicating an acceptable voltage level.

9. The lawnmower of claim 1 further comprising:

an override switch connected to said wires, said override switch cutting off power to said motor when the operator leaves an operating position.

10. The lawnmower of claim 1 further comprising:

a rotary blade connected to said mower and located beneath said housing, said rotary blade being set at a cutting height above a lawn; and, means for adjusting the cutting height.

11. The lawnmower of claim 1 further comprising a plurality of wheels attached to said housing; and, handlebars connected to said housing.

12. A method of operating an electric lawnmower having a power source battery with a capacity connected by wires to a motor which has a power draw through said wires as a result of a load on said motor located in a housing and a load indicator having a first zone indicating an unacceptable power draw level, a second zone indicating an acceptable power draw level, and an indicating parameter indicating an actual power draw level such that said indicating parameter being located in said first zone indicates an unacceptable actual power draw level, said load indicator providing a signal indicating to said operator to adjust an operating level of said electric lawnmower said method comprising the steps of:

operating said electric lawnmower;

ascertaining said actual power draw level from said load indicator; and, adjusting said operating level of said electric lawnmower to maintain said indicating parameter within said second zone.

13. The method of claim 12 wherein the step of adjusting an operating level to maintain said indicating parameter within said second zone comprises the step of:

pacing the speed of operation of said electric lawnmower.

14. The method of claim 12 wherein the step of adjusting an operating level to maintain said indicating parameter within said second zone comprises the step of:

adjusting a height at which said electric.

* * * * *